United States Patent

Pleyer et al.

[11] Patent Number: 5,865,391
[45] Date of Patent: Feb. 2, 1999

[54] SPRING DRIVEN REELING MECHANISM FOR SAFETY BELTS

[76] Inventors: Matthias Pleyer, Teutonenstrasse 6, 89250 Senden, Germany; Kitaro Kitai, 78 Bangor Road, Holywood, County Down BT18 0LW, Northern Ireland

[21] Appl. No.: 738,527

[22] Filed: Oct. 28, 1996

[30] Foreign Application Priority Data

Oct. 31, 1995 [DE] Germany ................. 195 40 627.3

[51] Int. Cl.⁶ ............................ B60R 22/34; B65H 75/48
[52] U.S. Cl. ....................................................... 242/375.3
[58] Field of Search ........................... 242/375.2, 375.3; 280/806; 297/475–480

[56] References Cited

U.S. PATENT DOCUMENTS

| | | | |
|---|---|---|---|
| 4,285,478 | 8/1981 | Stamboulian | 242/375.2 |
| 4,340,190 | 7/1982 | Zavatkay | 242/375.2 |
| 4,429,840 | 2/1984 | Chawla et al. | 242/373 |
| 4,771,965 | 9/1988 | Ballet | 242/375.2 |
| 4,920,564 | 4/1990 | Karisson | 242/375.3 |
| 5,409,176 | 4/1995 | Kopetzky | 242/375.3 |
| 5,628,470 | 5/1997 | Ray et al. | 242/375.3 |

FOREIGN PATENT DOCUMENTS

| | | |
|---|---|---|
| 20 57 728 | 6/1972 | Germany. |
| 24 51 400 | 5/1975 | Germany. |
| 39 18 934 | 12/1990 | Germany. |
| 42 25 073 | 2/1994 | Germany. |
| 42 41 730 | 6/1994 | Germany. |
| 44 09 009 | 9/1995 | Germany. |
| 44 23 739 | 1/1996 | Germany. |

Primary Examiner—John M. Jillions

[57] ABSTRACT

A spring driven belt reeling mechanism for safety belts (17) in motor vehicles has a belt reel (11) which is rotationally fixedly connected to a first thread reel (12), having a helical guide groove (15). A flexible thread (13) is wound onto the guide groove (15) and extends to a second thread reel (14) with a helical guide groove (18). The two thread reels (12, 14) taper in opposite axial directions. The second thread reel (14) is acted on by a spiral spring (16) in the direction of rotation such that the safety belt (17) is wound onto the belt reel (11). The spiral spring (16) is arranged in its own spring housing (49) in such a way that it is rotationally fixedly mounted radially outwardly at the spring housing (49) and radially inwardly at a spring core bearing (30).

12 Claims, 1 Drawing Sheet

SPRING DRIVEN REELING MECHANISM FOR SAFETY BELTS

BACKGROUND OF THE INVENTION

1. Field of the Invention

The invention relates to a spring driven reeling mechanism for safety belts, and also to a method of installing a spring driven reeling mechanism for safety belts.

2. Description of Related Art

Known spring driven belt reeling mechanisms of this kind (DE-OS 42 25 073, DE-OS 42 41 730, DE-OS 44 09 009, DE-OS 44 43 729) have the advantage that the belt draw-out force is kept constant or can also be reduced in dependence on the drawn-out length in a desired manner.

In this way the wearing comfort for the vehicle occupants is substantially increased, because the pull-out force in the worn state is substantially reduced. When, however, the belt is to be rolled up again after it has been taken off, the pull-in force increases in a desired manner so that a reliable draw-in of the safety belt is ensured.

SUMMARY OF THE INVENTION

The present invention has the object of further improving a spring driven reeling mechanism of the initially named kind. In particular the moment of inertia forces should be reduced. Furthermore, the ease of movement should be increased and the assembly should be facilitated.

Since the outer regions of the spiral spring arrangement either do not move or only move a little through connection to the immovable housing, and since the spring movement on pulling out the safety belt essentially takes place in the radially inner region of the spiral spring arrangement, the masses of the spiral spring which are moved on drawing in and drawing out of the safety belt are substantially reduced. In this respect account should be taken of the fact that the thread reels are actuated each time the belt is put on or taken off so that, in the course of the life-time of a vehicle thousands of pull-in and pull-out movements of the thread reel and also of the spiral spring arrangement take place.

As a result of the further development the assembly is made substantially easier because the spring housing with the spiral spring arrangement, and optionally a cover on the spring housing, can initially be separately manufactured and then built into the conical housing as a unit.

The provision of a spring core shaft and a spring housing is particularly advantageous because in this way a completely operable spring arrangement is made available, and the spiral spring arrangement can also be transferred from the outset into its fully tensioned state by a corresponding rotation of the spring core shaft relative to the spring housing.

The invention is particularly advantageously used in a belt reeling mechanism in accordance with DE-OS 195 18 772. In this case the spring housing should be accommodated in a hollow, truncated cone region, which enlarges in step-like manner, or also in a hollow, cylindrical region.

The rotary journalling of the second thread reel should preferably take place in the hollow conical region of smaller average diameter.

In order that the thread is reliably introduced into the guide grooves during installation, a thread guiding jig is expediently provided and is movable in a suitable manner.

In a further embodiment, the corresponding tapering direction of the two thread reels substantially facilitates the installation and substantially reduces the constructional space which is required.

This embodiment can in particular be developed further in, whereby the element providing security against rotation can be accommodated in a countersunk manner, which is important for the storage and the dispatch of the belt reeler of the invention.

Another object of the present invention is to provide a; particularly advantageous method for installing a spring driven reeling mechanism.

BRIEF DESCRIPTION OF THE DRAWINGS

The invention will be described in the following by way of example and with reference to the drawings in which are shown.

DETAILED DESCRIPTION OF THE PREFERRED EMBODIMENTS

Figure 1:
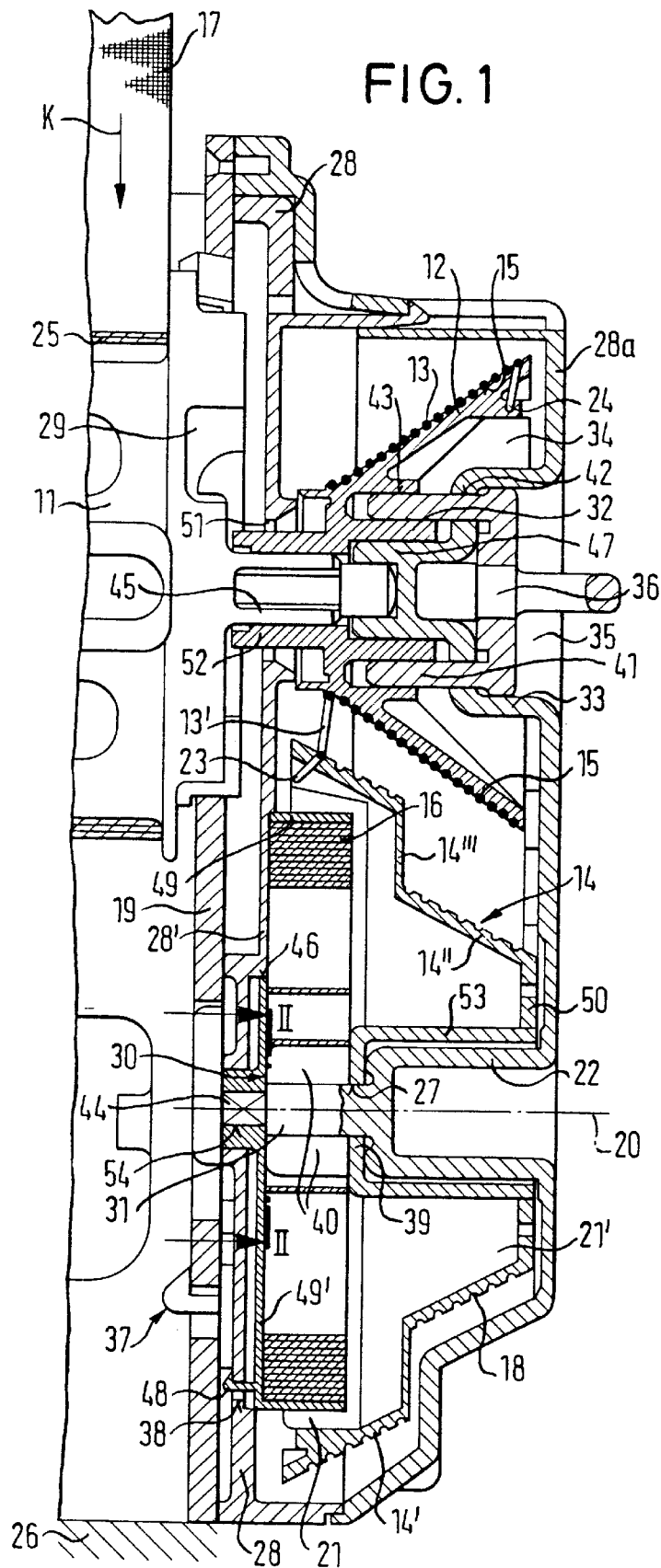
FIG. 1 a partly sectioned view of a spring driven reeling mechanism for safety belts in accordance with the invention in the approximately fully drawn-out state of the safety belt, and FIG. 2 a sectional view on the line II—II in FIG. 1.

In accordance with FIG. 1 a belt reeling mechanism in accordance with the invention has a belt reel 11, cooperating with a belt draw-out blocking device 29. A safety belt 17, of which only a short piece is indicated, is wound onto the belt reel 11 to form a belt coil 25. The belt reel 11 is journalled in a reeling mechanism frame 19 which is secured to the vehicle chassis and to which a reeling mechanism base plate 28 is attached, through a snap connection 37, with the reeling mechanism base plate 28 and a cover 28a mounted on the side remote from the belt reel 11 forming a reeling mechanism housing. The belt draw-out blocking device 29, for which only the receiving space is shown in FIG. 1, prevents further pulling out of the safety belt 17 in the case of accident dependent accelerations. A complementary sleeve 52 of a conically shaped thread reel 12 extending away from the belt reel 11 is axially and coaxially mounted within the housing 28, 28a on a non-round spigot 45 of the belt reel 11 which extends through a bore 51 of the base plate 28 and is in this manner rotationally fixedly coupled to the belt reel 12. The thread reel 12 is rotationally journalled on a bearing projection 47 fixed to the cover and is provided at its periphery with a helical guide groove 15.

Alongside with the thread reel 12 and laterally aligned with it there is provided a second thread reel 14 with its axis 20 extending parallel to the spigot 45, with the second thread reel 14 extending conically opposite to the first thread reel 12, and having a hollow, truncated cone region 14' of larger average diameter, and a hollow cone region 14" of smaller average diameter. The two regions 14', 14" merge into one another via a ring step 14'" which has a non-illustrated transition groove, as can be found in detail from DE-OS 195 18 772. The second thread reel 14 has at its circumference a helical guide groove 18 and sits rotatably at 27 on a hollow spigot 22 fixed relative to the housing which extends from the cover 28a in the direction towards the interior of the housing 28, 28a, and which extends parallel to the spigot 45 and is displaced downwardly relative to it.

The second thread reel 14 contains, in the truncated cone region 14', a hollow chamber 21 which is open in the direction towards the belt reel 11. A spring housing 49 is accommodated in the hollow chamber 21 and is held fixed to the housing by means of snap hooks 48 in openings 38 of the base plate 28. The spring housing is essentially of pot-like shape, with a right cylindrical wall and contains a spiral spring arrangement 16 which is rotationally fixedly held radially outwardly at the spring housing 49 and stands radially inwardly in a rotationally fixed connection with a hollow spring core bearing 30 coaxial to the axis 20 of the thread reel 14. The spring core bearing 30 is preferably connected in one piece to the second thread reel 14 which is arranged coaxially thereto via a ring plate 39 and a carrying sleeve 53 which surrounds the spigot 22 with a small spacing. The carrying sleeve 53 projects from the base 50 of the second thread reel 14 in the direction towards the spring housing 49. The central opening of the ring plate 39 sits on a shaft-like extension 31 of the hollow spigot 22 and contributes to the rotary mounting 27. The spring core bearing 30 consists of a plurality of noses 40, in particular 6 noses uniformly distributed over the periphery, which project axially from the ring plate 39 and rotatably sit on the extension 31. At the end of the extension 31 remote from the hollow spigot 22 there is provided a square shaft 44 which is seated in a complementary central square opening 54 of a plate part 49' of the spring housing extending perpendicular to the axis of rotation 20 in order to provide a rotationally fixed connection between the cover 28a (via 22, 31) and the spring housing 49. A hollow space 21' of the cone region 14" of reduced average diameter is provided around the carrying sleeve 53.

A thread 13 is wound from the securing point 24 in the broadened end region of the first thread reel 12 into the guide groove 15 of the thread reel 12 and extends from the tapered end region of the thread reel 12 via a straight tensioned piece 13' into the thread groove 18 of the second thread reel 14, where the other thread end is secured at 23 to the enlarged end region of the second thread reel 14.

The cover 28a has a set-back wall 33 in the region of the first thread reel 12 in the center of the latter and this wall engages into a hollow space 34 of the thread reel 12, whereby a space 35 is provided outwardly for receiving an element 36 providing security against rotation. This element has one or more axial spigots 41 which pass through bores 42 in the set-back wall 33 and each engage into an axial blind bore 43 of the first thread reel 14. In this way on tensioning the spiral spring arrangement 16, security is provided preventing rotation of the thread reel 12 in the unwinding direction of the thread 13.

The spiral spring arrangement 16 transfers to the thread reel 14 a torque which tends to wind up the thread 13 laid into its guide groove 18. This leads to the thread piece located on the thread reel 12 being unwound from the thread reel 12.

In the winding position shown in FIG. 1 the thread 13 is largely fully wound onto the first thread reel 12 and largely fully unwound from the second thread reel 14. In this state the belt coil 25 on the belt reel 11 has the smallest diameter, i.e. only a minimum belt length is located on the belt reel 11 and the belt 17 has attained its largest drawn-out length.

The thread reel 14 is loaded or turned by the spiral spring arrangement 16 in the thread winding up direction and the first thread reel 12 in the thread unwinding direction so that on releasing the drawn-out safety belt 17 the thread 13 is wound off more and more from the first thread reel 12 and onto the second thread reel 14.

The assembly of the described arrangement proceeds as follows:

First of all the removed cover 28a is preferably placed with its inner side facing upwardly into a non-illustrated installation device. Thereafter the thread reel 12 with the thread 13 which is already secured at 24 is placed onto the bearing projection 47 of the cover 28a and the thread is subsequently laid into the guide groove 15 by rotation of the thread reel 12 until the thread reel 12 is fully wound.

Thereafter the second thread reel 14 is placed onto the shaft-like extension 31 of the hollow spigot 22 fixed relative to the cover until it likewise adopts the position relative to the cover 28a which can be seen from FIG. 1.

Figure 2:
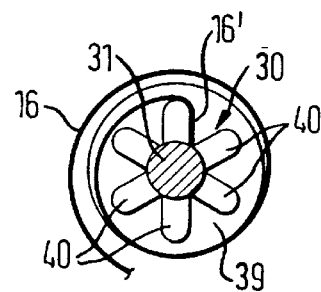

The spring housing 49 with the already installed spiral spring arrangement 16 in the as yet untensioned state of the spiral spring arrangement 16 is now pushed axially onto the spring core bearing 30, with the bent down radially inner end 16' of the spiral spring arrangement 16 being pushed axially into one of the peripheral intermediate spaces between the noses 40 of FIG. 2. At the same time the square opening 54 is placed onto the square shaft 44 in order to produce a rotationally fixed connection between the cover 28a and the spring housing 49. Should the end 16' not be in axial alignment with one of the intermediate spaces between the noses 40 during installation, or should the square opening 54 not be suitably aligned with the square shaft 44, then the alignment can be achieved by simple rotation of the spring housing 49 and/or of the thread reel 14.

After the placement of the spring housing 49 onto the spring core bearing 30 the spiral spring arrangement 16, which is rotationally fixed to the peripheral wall of the spring housing 49 at its radially outer end, is in rotationally fixed engagement with the thread reel 14.

The second thread reel 14 is now turned in the spring tensioning direction until the spiral spring arrangement 16 has reached its maximum state of tension. Then the free end of the thread 13 wound onto the first thread reel 12 is secured at 23 to the second thread reel 14.

Prior to this or thereafter the element 36 providing security against rotation is brought into the rotary blocking position which is evident from FIG. 1, whereby a rotation of the thread reel 14 is prevented.

If the spiral spring arrangement 16 which is tensioned by a suitable tool is now released, then it can transmit its drive torque to the second thread reel 14 that the tensioned, straight thread piece 13' is present between the thread reels 12, 14. A further rotation of the thread reels 12, 14 is prevented by the element 36 providing security against rotation.

The base plate 28 is subsequently placed axially onto the cover 28a, with the opening 38 sliding over the snap hooks 48 and the snap hooks 48 engaging behind the base plate 28. In this manner, the spring housing 49 is fixedly connected, and in particular rotationally fixedly connected, to the base plate 28. The square opening 54 of the plate part 49' of the spring housing 49 thereby remains in rotationally fixed connection with the square shaft 44 in order, in this way, to also retain the rotationally fixed connection produced with the cover 28a for the assembly.

In this state the finally assembled reeling mechanism housing 28, 28a can be transported and stored.

On assembly with a belt reeling mechanism the base plate 28 is set in the manner evident from FIG. 1 axially onto the reeling mechanism frame 19, which results in penetration of the spigot 45 of the belt reel 11 into the sleeve 52 of the second thread reel 14 and thus a rotationally fixed connection is produced between the belt reel 11 and the first thread reel 12. Furthermore, the snap connection which is provided is established at 37 between the reeling mechanism housing 28, 28a and the reeling mechanism frame 19. If desired, several snap connections 37 can be provided at suitable positions.

On the right hand side in FIG. 1 the spring housing 49 is closed off by the second thread reel 14.

At the side confronting the belt reel 11 the spring housing 49 has a sector-like opening 46 into which the plate part 49' of the base plate 28 engages.

Other possibilities of installation are conceivable. Thus, in accordance with a further embodiment, the installation can proceed as follows:

First of all, the spiral spring 16 is inserted axially into the spring housing 49 from the open side in the state removed from the reeling mechanism housing 28, 28a and is secured to the spring housing 49 at its periphery, for example by clipping. In this state the spring housing 49 is mounted from the right in FIG. 1 axially onto the reeling mechanism base plate 28 and is fixed axially and in the peripheral direction to the reeling mechanism base plate 28 either by insertion and snapping into place of the snap hooks 48 in the openings 38 of the reeling mechanism base plate 28 or in another manner.

The spring housing 49 can also fundamentally be a fixed, integral component of the reeling mechanism base plate 28, with it only being necessary to provide a suitable end opening at the one or other axial side in order to introduce the spiral spring 16 into the spring housing 49 and to be able to rotationally fixedly secure it at the outside to the housing 28, 28a and also at the inside to the spring core bearing 30. It is only necessary that the spring housing 49 is so arranged that after the introduction and mounting of the spiral spring 16 the second thread reel 14 can also be attached in the following described manner.

The second thread reel 14 is then set in place from the right in FIG. 1—still without the wound-up thread 13 —with the noses 40 penetrating into the central opening of the spiral spring 16 and the spring end 16' lying in the manner which can be seen from FIG. 2 between two adjacent noses 40. By means of a suitable rotary tool, the spring core bearing 30 is now rotated in the tensioning direction of the spiral spring 16 until the spiral spring 16 is tensioned to the maximum amount. The rotation of the spring core bearing 30 takes place most expediently in that the rotary tool acts at a suitable position, for example at the largest periphery of the second thread reel 14.

A thread 13 secured at 23 to the second thread reel 14 is now wound by continuous relaxation of the spiral spring 16 onto the periphery of the second thread reel 14 into the guide groove 18. Guidance of the tensioned thread is effected by means of a suitable thread guiding jig so that the latter is placed in an orderly manner into the guide groove 18.

When the regions 14' and 14" are fully wound with the thread 14 the spiral spring 16 should still have a residual tension which is necessary to keep the thread 13 tensioned in operation.

Now the end of the thread coil located on the thread reel 14 is fixed in a suitable manner, for example by means of the thread guiding jig, and the thread reel is held in the position which has been reached.

The free end of the thread 13 is now secured to the thread reel 12 at 24 which has been inserted in the meantime into the bore 51. Thereafter the cover 28 is set in place and secured to the reeling mechanism base frame 28. Now the thread reel 12 is rotated by a suitable tool so that the thread 13 is unwound through corresponding rotation from the second thread reel 14 and is successively wound up onto the thread reel 13 until the latter is fully wound with thread 13 in the manner which can be seen from FIG. 1. In this state the spiral spring 16 is again fully tensioned. This is the state in which the belt reeling housing 28 is to be assembled to the belt reel 11.

In order to now maintain the so tensioned position of the arrangement, comprising the first thread reel 12 and the second thread reel 14, during transport and storage until assembly with the belt reel 11, the plug spigots 41 of the rotary securing element 36 are pushed through the bores 42 of the setback wall part 33 into the blind bores 43 of the first thread reel 12. Now the first thread reel 12 is secured against rotation and the tensioned position of the two thread reels 12, 14 and also of the thread 13 and remains fixed until, after assembly with the belt reel 11, the rotary securing element 36 is again withdrawn axially.

The arrangement of the thread reels 12, 14 in accordance with FIG. 1 in the manner such that the first thread reel 12 diverges when viewed from the belt reel 11 and the second thread reel 14 tapers has the advantage that in this manner the hollow cavity 21, 21' of the second thread reel 14 is available to receive the spring housing 49 and the carrying sleeve 53. Moreover, the set-back wall 33 of the cover 28a with the bearing projection 47 of the bearing sleeve 32 of the first thread reel 12 can be received in the hollow cavity 34 of the first thread reel 12. In addition, the constructional space is substantially reduced.

A further type of installation proceeds as follows:

First of all, the one end of the thread is secured at 24 to the first thread reel 12 which is inserted into the opening 51 and the thread is then fully wound onto the thread reel 12. Then the other thread end is secured at 23 to the thread reel 14. In this state the thread reel 14 is axially mounted onto the reeling mechanism base plate 28, where the spring housing 49 with the fully tensioned spiral spring 16 may already be found. As soon as the rotationally fixed connection has been produced between the radially inner end 16' of the spiral spring 16 and the spring core bearing 30, the cover 28a is set in place while holding the tensioned spring via the square shaft 44 and is secured to the base plate 28. The element 36 providing security against rotation is now inserted to secure the first thread reel 12 against rotation, and the tensioning force for the spiral spring 16 applied by the square shaft 44 is removed, whereupon the spiral spring 16 can transmit the corresponding torque to the second thread reel 14, the thread and the first thread reel 12, which is, however, rotationally secured by the element 36 providing security against rotation. In this state the entire arrangement can be stored and can be transported prior to its assembly with a belt reel 11.

REFERENCE NUMERAL LIST 11 belt reel
12 first thread reel
13 thread
14 second thread reel
14' truncated cone region of the second thread reel
14" cone region of the second thread reel
14'" ring step
15 guide groove
16 spiral spring arrangement
16' spring end
17 safety belt
18 guide groove
19 reeling mechanism frame
20 axis of rotation
21 hollow cavity
21' hollow cavity
22 hollow spigot fixed on the cover
23 mounting point
24 mounting point
25 belt coil 26 vehicle chassis
27 bearing
28 reeling mechanism base plate
28' part
28a cover
29 belt draw-out blocking device
30 spring core bearing
31 shaft-like extension
32 bearing sleeve
33 wall
34 hollow cavity
35 receiving space
36 element providing security against rotation
37 snap connection
38 opening
39 ring plate
40 noses
41 plug spigot
42 bore
43 blind bore
44 square shaft
45 spigot
46 opening
47 bearing projection
48 snap hook
49 spring housing
49' plate part
50 base
51 bore
52 sleeve
53 carrying sleeve
54 central square opening

We claim:

1. Spring driven reeling mechanism for safety belts in motor vehicles, comprising:

a belt reel having a belt pull-out blocking device, a first thread reel being rotationally fixedly connected, in particular coaxially and directly connected, to the belt reel, the first thread reel tapering in the axial direction and having a spiral guide groove at its periphery, a flexible thread secured at one end to the thread reel and wound into the groove contrary to the winding sense of the safety belt onto the belt reel, a second thread reel arranged parallel to the first thread reel in lateral alignment, wherein the second thread reel tapers in the opposite axial direction and has a spiral guide groove, another end of the thread being secured to the second thread reel and being wound into the guide groove of the second thread reel, wherein the second thread reel is rotationally connected to the first thread reel by the thread, the two guide grooves being so designed and arranged on the thread reels that the tensioned thread piece connecting the two thread reels merges at least substantially kink-free between the thread reels, a spiral spring arrangement biasing the second thread reel in the winding up direction of the thread onto the second thread reel and of the safety belt onto the belt reel, wherein the spiral spring arrangement is accommodated in a spring housing at least partially in a hollow cavity of the second thread reel, with the cavity being at least partly surrounded by the guide groove, wherein the spring housing is secured inside a reeling mechanism housing, the spiral spring arrangement is rotationally fixedly connected radially outwardly to the spring housing and radially inwardly to the second thread reel, and a spring core bearing for rotationally fixedly mounting the radially inner end of the spiral spring arrangement, the spring core bearing is fixedly connected to the second thread reel, in particular in one piece with it, in which case the radially inner end of the spiral spring arrangement is releasably connectable to the spring core bearing.

2. Spring driven reeling mechanism for safety belts in motor vehicles, comprising:

a belt reel having a belt pull-out blocking device, a first thread reel being rotationally fixedly connected, in particular coaxially and directly connected, to the belt reel, the first thread reel tapering in the axial direction and having a spiral guide groove at its periphery, a flexible thread secured at one end to the thread reel and wound into the guide groove contrary to the winding sense of the safety belt onto the belt reel, a second thread reel arranged parallel to the first thread reel in lateral alignment, wherein the second thread reel tapers in the opposite axial direction and has a spiral guide groove, another end of the thread being secured to the second thread reel and being wound into the guide groove of the second thread reel, wherein the second thread reel is rotationally connected to the first thread reel by the thread, the two guide grooves being so designed and arranged on the thread reels that the tensioned thread piece connecting the two thread reels merges at least substantially kink-free between the thread reels, a spiral spring arrangement biasing the second thread reel in the winding up direction of the thread onto the second thread reel and of the safety belt onto the belt reel, wherein the spiral spring arrangement is accommodated in a spring housing at least partially in a hollow cavity of the second thread reel, with the cavity being at least partly surrounded by the guide groove, and the spiral spring arrangement is rotationally fixedly connected radially outwardly to the spring housing and radially inwardly to the second thread reel, wherein the second thread reel comprises a hollow truncated cone region of greater average diameter, which merges stepwise at its end having the smaller diameter into a conical region of smaller average diameter, characterized in that the spring housing is only located in the interior of the truncated cone region of larger average diameter.

3. Reeling mechanism in accordance with claim 2, further comprising:

bearing means for the second thread reel extending axially through the cone region of smaller average diameter, into the hollow truncated cone region of larger average diameter.

4. Spring driven reeling mechanism for safety belts in motor vehicles, comprising:

a belt reel having a belt pull-out blocking device, a first thread reel being rotationally fixedly connected, in particular coaxially and directly connected, to the belt reel, the first thread reel tapering in the axial direction and having a spiral guide groove at its periphery, a flexible thread secured at one end to the thread reel and wound into the guide groove contrary to the winding sense of the safety belt onto the belt reel, a second thread reel arranged parallel to the first thread reel in lateral alignment, wherein the second thread reel tapers in the opposite axial direction and has a spiral guide groove, another end of the thread being secured to the second thread reel, and being wound into the guide groove of the second thread reel, wherein the second thread reel is rotationally connected to the first thread reel by the thread, the two guide grooves being so designed and arranged on the thread reels that the tensioned thread piece connecting the two thread reels merges at least substantially kink-free between the thread reels, a spiral spring arrangement biasing the second thread reel in the winding up direction of the thread onto the second thread reel and of the safety belt onto the belt reel, wherein the spiral spring arrangement is accommodated at least partially in a hollow cavity of the second thread reel, with the cavity being at least partly surrounded by the guide groove, the first thread reel tapers towards the belt reel and the second thread reel tapers away from the belt reel, and a wall portion of a reeling mechanism housing being remote from the belt reel extending toward the belt reel into a hollow chamber formed by the first thread reel, the wall portion including a bearing projection having a free end proximate to a minimum diameter portion of the first thread reel for rotary journalling of the first thread reel.

5. Spring driven reeling mechanism for safety belts in motor vehicles, comprising:

a belt reel having a belt pull-out blocking device, a first thread reel being rotationally fixedly connected, in particular coaxially and directly connected, to the belt reel, the first thread reel tapering in the axial direction and having a spiral guide groove at its periphery, a flexible thread secured at one end to the thread reel and wound into the guide groove contrary to the winding sense of the safety belt onto the belt reel, a second thread reel arranged parallel to the thread reel in lateral alignment, wherein the second thread reel tapers in the opposite axial direction and has a spiral guide groove, another end of the thread being secured to the second thread reel, and being wound into the guide groove of the second thread reel, wherein the second thread reel is rotationally connected to the thread reel by the thread, the two guide grooves being so designed and arranged on the thread reels that the tensioned thread piece connecting the two thread reels merges at least substantially kink-free between the thread reels, a spiral spring arrangement biasing the second thread reel in the winding up direction of the thread onto the second thread reel and of the safety belt onto the belt reel, wherein the spiral spring arrangement is accommodated at least partially in a hollow cavity of the second thread reel, with the cavity being at least partly surrounded by the guide groove, the first thread reel tapers towards the belt reel and the second thread reel tapers away from the belt reel, a wall portion of a reeling mechanism housing extending into a hollow chamber formed by the first thread reel, the wall portion including a bearing projection for rotary journalling of the first thread reel, and an element for providing security against rotation of the first thread reel with respect to the housing, the element being received in a receiving chamber provided on the outside of the wall portion.

6. Method of installing a spring driven reeling mechanism for safety belts in motor vehicles, comprising a belt reel having a belt pull-out blocking device, wherein the belt reel is rotationally fixedly connected, in particular coaxially and directly connected, to a first thread reel which tapers in the axial direction and has a spiral guide groove at its periphery, wherein the thread reel is rotationally fixedly connected via a flexible thread secured at one end to the thread reel and into the guide groove, wound contrary to the winding sense of the safety belt onto the belt reel to a further, second thread reel arranged parallel to it in lateral alignment, wherein the second thread reel tapers in the opposite axial direction and has a spiral guide groove, with the other end of the thread being secured to the second thread reel, and with the thread being wound into the guide groove of the second thread reel, wherein the second thread reel is biased by a spiral spring arrangement in the winding up direction of the thread onto the second thread reel and of the safety belt onto the belt reel, with the two guide grooves being so designed and arranged on the thread reels that the tensioned thread piece connecting the two thread reels merges at least substantially kink-free between the thread reels, and wherein the spiral spring arrangement is accommodated at least partially in a hollow cavity of the second thread reel, with the cavity being at least partly surrounded by the guide groove, the method comprising the steps:

introducing the spiral spring arrangement into a spring housing and securing to the latter radially outwardly;

introducing a spring core bearing radially inwardly into the spiral spring arrangement and rotationally fixedly connecting the spring core bearing to the spiral spring arrangement;

rotating the spring core bearing in the spring tensioning direction until the spiral spring arrangement is tensioned to the maximum amount;

locating the thread reels together with the thread wound thereon and secured thereto in a reeling mechanism housing;

removing a force holding the spiral spring arrangement tensioned; and mounting the finished reeling mechanism housing on a reeling mechanism frame.

7. Method in accordance with claim 6, further comprising the steps:

laying a cover of the reeling mechanism housing into an installation device with its inner side facing upwardly;

placing the first thread reel with the thread secured on it onto a rotary bearing in the cover;

winding the thread, using a thread guiding jig, into the guide groove of the first thread reel until the thread reel is fully wound with the thread;

mounting the second thread reel onto its rotary bearing in the cover;

installing the un-tensioned spiral spring arrangement in the spring housing;

mounting the spring housing with the already installed but not yet tensioned spiral spring arrangement onto the spring core bearing, that is fixedly connected to the second thread reel, and rotationally fixedly connecting the spring housing to the reeling mechanism housing by rotationally fixedly placing a four-sided, central opening of the spring housing onto a complementary projecting square stub on a shaft-like extension of a hollow spigot fixed to the cover and passing through the hollow spring core bearing;

tensioning the spiral spring arrangement to its maximum by corresponding rotation of the second thread reel;

securing the second thread end to the second thread reel;

mounting an element providing security against rotation on the first thread reel;

mounting and connecting a reeling mechanism base plate onto the reeling mechanism housing cover, whereupon the spring housing is clipped onto the base plate providing a secure, rotationally fixed support of the spring housing which is independent of the rotationally fixed connection between the cover and the spring housing.

8. Method in accordance with claim 6, further comprising the steps:

axially assembling the second thread reel and the spring housing and rotationally fixedly coupling the second thread reel and the spring core bearing together;

pretensioning the spiral spring to its maximum;

securing the one end of the thread to the second thread reel;

concurrently relaxing the spiral spring arrangement (16), and winding the thread with guidance through a thread guiding jig, into its guide groove on the second thread reel;

fixing the thread to the second thread reel by the thread guiding jig and securing the other end of the thread to the first thread reel;

concurrently winding the thread off from the second thread reel onto the first thread reel under guidance by the thread guiding jig and tensioning the spiral spring arrangement anew; and attaching an element providing security against rotation to the first thread reel after at least extensive winding of the first thread reel and extensive tensioning of the spiral spring arrangement.

9. Method in accordance with claim 6, further comprising the steps:

securing and winding the thread on the first thread reel;

subsequently securing the other end of the thread to the second thread reel;

mounting the second thread reel onto the tensioned spiral spring arrangement; and mounting an element providing security against rotation onto the first thread reel and removing the force which keeps the spiral spring arrangement tensioned.

10. Method in accordance with claim 6, wherein the finished reeling mechanism housing is mounted on the reeling mechanism frame by clipping onto it.

11. Spring driven reeling mechanism for safety belts in motor vehicles, comprising:

a belt reel having a belt pull-out blocking device, a first thread reel being rotationally fixedly connected, in particular coaxially and directly connected, to the belt reel, the first thread reel tapering in the axial direction and having a spiral guide groove at its periphery, a flexible thread secured at one end to the thread reel and wound into the guide groove contrary to the winding sense of the safety belt onto the belt reel, a second thread reel arranged parallel to the first thread reel in lateral alignment, wherein the second thread reel tapers in the opposite axial direction and has a spiral guide groove, another end of the thread being secured to the second thread reel and being wound into the guide groove of the second thread reel, wherein the second thread reel is rotationally connected to the first thread reel by the thread, the two guide grooves being so designed and arranged on the thread reels that the tensioned thread piece connecting the two thread reels merges at least substantially kink-free between the thread reels, a spiral spring arrangement biasing the second thread reel in the winding up direction of the thread onto the second thread reel and of the safety belt onto the belt reel, wherein the spiral spring arrangement is accommodated in a spring housing at least partially in a hollow cavity of the second thread reel, with the cavity being at least partly surrounded by the guide groove, wherein the spring housing is secured inside a reeling mechanism housing, the spiral spring arrangement is rotationally fixedly connected radially outwardly to the spring housing and radially inwardly to the second thread reel, and a spring core bearing for rotationally fixedly mounting the radially inner end of the spiral spring arrangement, the spring core bearing is rotatably arranged centrally in the spring housing, and rotationally fixedly coupled to the second thread reel by axial placement of the second thread reel with respect to the spring housing.

12. Spring driven reeling mechanism for safety belts in motor vehicles, comprising:

a belt reel for winding the safety belt, a first thread reel being rotationally fixedly connected to the belt reel, the first thread reel tapering in an axial direction and having a spiral guide groove at its periphery, a second thread reel arranged parallel to the first thread reel in lateral alignment, wherein the second thread reel tapers in the opposite axial direction and has a spiral guide groove, the second thread reel having a hollow truncated cone region of greater average diameter, which merges stepwise at its end having the smaller diameter into a conical region of a smaller average diameter, a flexible thread secured at one end to the thread reel and wound into the guide groove contrary to the winding sense of the safety belt onto the belt reel, another end of the thread being secured to the second thread reel and being wound into the guide groove of the second thread reel, wherein the second thread reel is rotationally connected to the first thread reel by the thread, and a spiral spring arrangement biasing the second thread reel in the winding up direction of the thread onto the second thread reel and of the safety belt onto the belt reel, the spiral spring arrangement is rotationally fixedly connected radially outwardly to a housing and radially inwardly to the second thread reel.

* * * * *

UNITED STATES PATENT AND TRADEMARK OFFICE
CERTIFICATE OF CORRECTION

PATENT NO.   : 5,865,391  
DATED        : February 2, 1999  
INVENTOR(S)  : Matthias Pleyer et al.

Page 1 of 1

It is certified that error appears in the above-identified patent and that said Letters Patent is hereby corrected as shown below:

<u>Title page,</u>  
Please add -- Assignee [73]: TAKATA (Europe) Vehicle Safety Technology GmbH, Ulm, Federal Republic of Germany --.

Signed and Sealed this

Twelfth Day of November, 2002

*Attest:*

JAMES E. ROGAN  
*Attesting Officer*   *Director of the United States Patent and Trademark Office*